Sept. 16, 1941.   W. M. McNEIL   2,256,000
BRAKE SHOE REINFORCING AND METHOD OF MAKING THE SAME
Filed Feb. 20, 1939   3 Sheets-Sheet 1
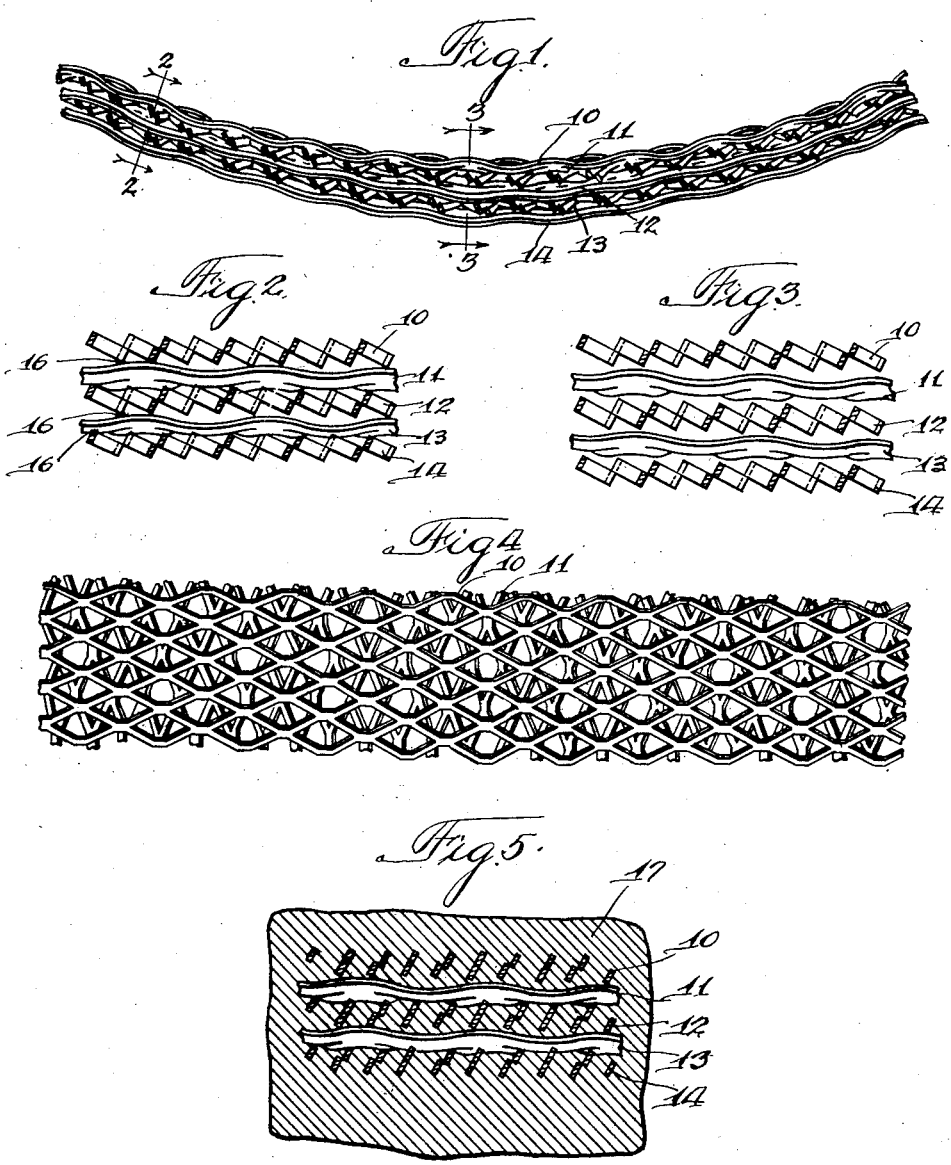

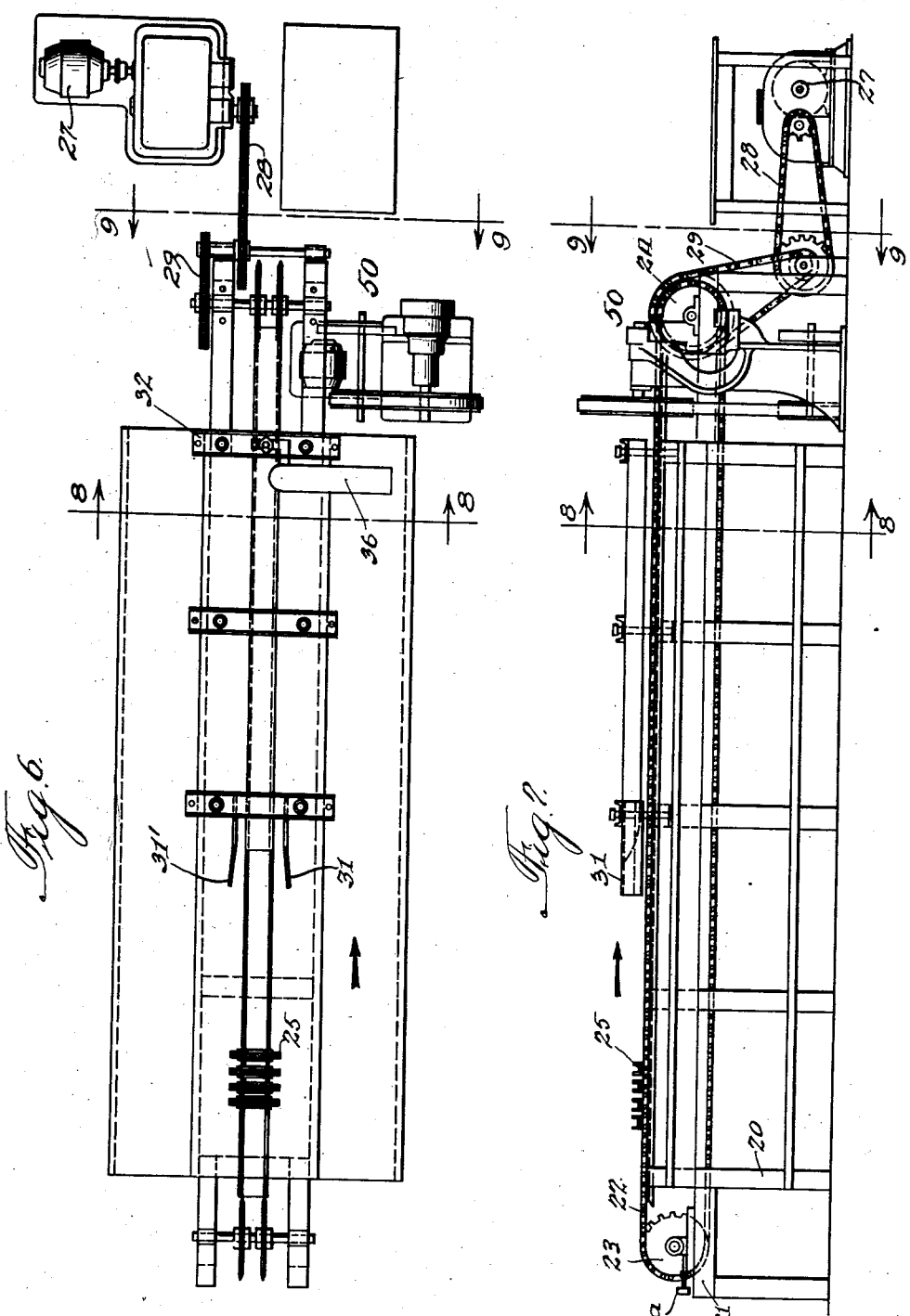

Sept. 16, 1941.  W. M. McNEIL  2,256,000
BRAKE SHOE REINFORCING AND METHOD OF MAKING THE SAME
Filed Feb. 20, 1939  3 Sheets-Sheet 3

Inventor.
William M. McNeil.
By Ambs, Thiess, Olson & Mecklenburger
Attys.

Patented Sept. 16, 1941

2,256,000

UNITED STATES PATENT OFFICE 2,256,000

BRAKE SHOE REINFORCING AND METHOD OF MAKING THE SAME

William M. McNeil, Wheaton, Ill., assignor to United States Gypsum Company, Chicago, Ill., a corporation of Illinois Application February 20, 1939, Serial No. 257,357

7 Claims. (Cl. 29—152.1)

The present invention relates to an improved form of expanded metal brake shoe reinforcing and the method of making the same.

One of the objects of the invention is to produce a laminated expanded metal brake shoe reinforcing in which the various laminations are held in contact with each other by spot welding either the entire contacting areas of the various laminations or at selected points.

A further object of the invention is to produce a special form of laminated expanded metal reinforcing in curved form, preshaped to fit the brake shoes with which it is to be used, the laminations of the reinforcing being attached to each other by spot welding at or near the ends of the brake shoe reinforcing, thus leaving the laminations in loose contact through the greater portion of the brake shoe reinforcing.

A further object of the invention is to provide a method of assembling, transporting, welding, and shaping a laminated expanded metal brake shoe reinforcing in a continuous rational operation so as to speed up the production and insure the manufacture of uniform brake shoe reinforcing of improved characteristics.

Other objects of the invention will become apparent from the further description hereinbelow, the hereunto appended drawings, and the claims.

In the drawings,

Fig. 1 is an elevational view of a finished brake shoe reinforcing of the present invention on a reduced scale;

Fig. 2 is a cross section along the line 2—2 of Fig. 1 of substantially the same size as the finished article of the present invention and hence on a larger scale than Fig. 1;

Fig. 3 is a cross section along the line 3—3 of Fig. 1 on substantially the same scale as Fig. 2 but showing the spacing between the laminations on a somewhat exaggerated scale;

Fig. 4 is a top plan view of the two upper laminations of the product shown in Fig. 1, this being on about the same scale as Fig. 1 and illustrating the relative position of the laminations;

Fig. 5 is a cross sectional view of a fragment of a brake shoe, showing the central portion of the brake shoe reinforcing embedded therein;

Fig. 6 is a top plan view of a machine for assembling, aligning, welding, and shaping the brake shoe reinforcing;

Fig. 7 is a side elevational view of the same machine as shown in Fig. 6;

Figure 8:
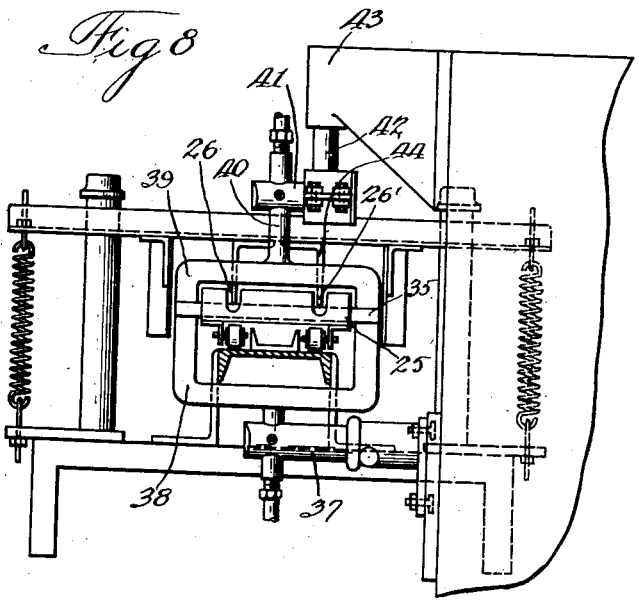
Fig. 8 is a section along the line 8—8 of Figs. 6 and 7.

Broadly speaking, the present invention covers a laminated expanded metal brake shoe reinforcing which differs from that of the prior art in that the laminations are spot welded to each other. Hitherto this general type of reinforcing has been made by superimposing a plurality of layers of expanded metal, the diamonds of each layer being disposed at substantially right angles with the other layers, five laminations usually being employed, in which the two outermost layers had their diamonds running along the general axis of the reinforcing while the second and fourth layers had the diamonds running crosswise or in the direction of the shorter dimension of the reinforcing. Hitherto it has been customary to tie the laminations together by means of metallic tie wires, this being done either before or after the reinforcing had been bent into the curved shape corresponding to the shape of the brake shoe with which it was to be associated. It has also been customary in the past, after tying the laminations together by means of wire, to dip the entire assembly into a heavy oil or asphalt paint and then to dust or sprinkle the material with or tumble it in finely divided silica flour for the purpose of providing a coating of silica upon the entire metallic structure. The purpose of this was to prevent the destruction and burning of the brake shoe reinforcing when placed in the mold and when the molten iron was poured around it to form the finished brake shoe. Because of the fact that silica is incombustible and nonvolatile, it would prevent actual interfusion between the metal of the reinforcing and the cast iron or mild steel of the brake shoe, the purpose of course being the maintenance of the reinforcing in the natural condition within the brake shoe. Should the latter crack in service, it might fall into the roadway, causing derailment of the train or other vehicle to which it was attached. The reinforcing prevents this from happening.

It has been found that the use of wires to tie the laminations of brake shoe reinforcing together is not satisfactory and is insufficiently rigid to maintain the laminations in accurate alignment with each other. As a result they tend to slide over each other causing abrasion. Furthermore, in the handling of the oil-asphalt-silica coated brake shoe reinforcing, abrasion of this coating often occurs, particularly also of the tie wire, so that bare spots form which, when the melted iron is poured around the brake shoe reinforcing during the casting operations, cause the wire to burn through, thus releasing the laminations from each other so that they are no longer distributed in the molten cast iron (and hence in the finished brake shoe), in the desired orientation and as a unit in which all the laminations are attached permanently to each other.

By the present invention all of these difficulties are solved at one time. In the first place, the laminations are kept accurately in alignment, and there is no danger of relative movement between the laminations, either prior to or during the casting operation.

Referring to Fig. 1, which is a side elevational view of the laminated brake shoe reinforcing, it will be seen that this consists of a plurality (in this case five) of individual pieces 10, 11, 12, 13 and 14 of expanded metal. The same numerals have been retained, in the same order, in Figs. 2, 3, 4 and 5. This reinforcing is bent to arcuate shape with approximately the curvature shown in Fig. 1. As can best be seen from Figs. 2, 3 and 4, the various laminations are arranged at an angle to each other, preferably at a right angle; for example, the upper layer 10, the intermediate layer 12 and the lowermost layer 14 have the diamonds of the expanded metal arranged longitudinally, while the intermediate layers 11 and 13 have the diamonds arranged at right angles to those of layers 10, 12 and 14. As can best be seen in Fig. 2 at the points 16, the various layers are welded to each other wherever they happen to contact, this being accomplished by electric welding, as will be more fully explained forthwith. In Fig. 5 a fragment of the iron brake shoe 17 is shown having embedded therein the reinforcing consisting of the five layers 10—14. Generally it is preferred to accomplish the welding only near the ends of the laminations, so that when the material is flexed or made arcuate there will be a very slight amount of play between the various laminations, as can best be seen in Fig. 3, although the space there shown is exaggerated. The purpose of allowing this small amount of play is to assure the flowing of all of the melted cast iron or mild steel around each and every portion of the reinforcing, so that it will be thoroughly embedded, to act as a strengthening agent for the brake shoe.

The method adopted for manufacturing the brake shoe reinforcing of the present invention is as follows: Suitable expanded metal is cut into strips which are respectively 2½ x 13 inches and 13 x 2½ inches; that is to say, layers 10, 12 and 14 will be 2½ x 13 inches and layers 11 and 13 will be 13 x 2½ inches, the first dimension given being that along the lesser dimensions of the diamonds or mesh of the expanded metal, i. e. across the diamonds. The various layers, as for example five in number, are arranged in substantially accurate alignment with each other and are then compressed so as to make good electric contact with each other, whereafter a suitable low-voltage but high-amperage current is passed through the different laminations, preferably near the ends of the assembled bundle, so as to cause electric welding wherever the various laminations happen to touch each other. The method of accomplishing this welding is well known in the art of welding metals and need not be more fully described than is necessary in connection with the apparatus which will be described hereinbelow. After the welding has been accomplished, the thus produced laminated structure is placed in a suitable mechanically operated press in which it is given the desired arcuate shape. It is however within contemplation of the present invention to shape the bundle first and then to effect the welding. The product thus resulting will be a laminated expanded metal brake shoe reinforcing having the laminations attached to each other by electric welding at their points of contact, at least near or at the ends thereof.

Referring now to the apparatus employed for the commercial manufacture of the product of the present invention, this is illustrated in Figs. 6 through 9 in sufficient detail to understand its principles, although it is to be understood that these figures are more or less diagrammatic and are not intended to be working drawings at all but merely to exemplify the primary means employed for carrying out the process and for manufacturing the product of the present invention.

Referring to Figs. 6 and 7, these are respectively a top plan view and a side elevational view of a machine which is made up of suitable supporting framework 20 and 21 to which there is attached a conveyor 22 which runs over sprockets 23 and 24 located respectively at the left and right-hand ends of Figs. 6 and 7. Suitable means for adjusting the tightness or looseness of this conveyor are provided by adjusting screws 24a. Attached to this conveyor are a plurality of trough-like carrying members 25, of which but four are illustrated in the drawings, it being understood of course that there is a large number of them. By reference to Fig. 8 it will be seen that these trough members 25 consist of two side pieces which have cut-away portions 26 and 26' for the purpose of permitting the compression of the laminations, as will be explained more in detail in connection with the description of Fig. 8. The conveyor 22 is driven by a suitable motor 27 through the intermediation of the drive 28 and 29 in such a manner that the conveyor will advance step by step, thus similarly advancing the therewith connected trough members 25. The workmen place the correct number of individual pieces of previously cut expanded metal into each of the trough members 25, orienting them as shown in Figs. 1 through 4. Under the influence of the motor 27 and the therewith connected drive, the conveyor 22 will advance step by step in a direction from left to right as shown by the arrows in Figs. 6 and 7, so that eventually one of the trough members will come between the divergently extending aligning members 31 and 31' which serve, under the influence of the advancement of the conveyor 22, properly to align the ends of the individual laminations which are still lying loosely on top of each other. This alignment is maintained on the further movement of the conveyor by reason of the fact that there are no further disturbing influences exerted upon the superimposed individual layers of expanded metal. When finally this assembled potential bundle of expanded metal arrives at the point 32 near the end of the machine, it will there encounter the instrumentalities which are illustrated in Fig. 8, to which attention is now directed. As will be seen from a perusal of the said figure, the trough members 25, with the laminated pieces or bundle 35 lying therein, arrive under the welding mechanism broadly designated 36. This consists of the lower supporting bracket 37 which in turn supports the lower half of the welding member 38 which has a corresponding upper welding member 39 which in turn is connected by means of arm 40 with bracket 41 which is bolted to the plunger arm 42 which reciprocates within the cylinder 43 which is connected, by means not shown in the drawings, with a supply of suitable operating fluid, either liquid or gaseous. It is thus possible to elevate and depress the welding member so as to exert a clamping action on the edges of the bundle 35. The arms 44 also serve to press down the central portions of the assembled bundle 35 so as to insure close contact of the laminations with each other. It is to be understood that the welding members 38 and 39 are respectively connected with a suitable source of electric current so that when the bundle arrives in position under the instrumentalities broadly designated by 36 in Fig. 8, and during the halt of the conveyor 22, the bundle will be compressed sufficiently to force the laminations into electrical contact with each other, whereafter a suitable electric current will automatically be passed through the laminations near their ends, thus striking innumerable arcs at the point of contact, thus thereby welding the parts together. This method of welding is a well known operation and hence needs no detailed description. Immediately after the formation of the welds, the plunger 42 will rise, thus releasing the arms 44 and the upper welding member 39 so that on the next movement of the bundle the now finished welded bundle will move one step farther on, thus placing a new bundle underneath the welding equipment. This operation thus is repeated for each bundle being made; in other words, as new bundles continue to arrive under the welding instrumentality, each bundle will be properly welded and made into a unitary structure.

Figure 9:
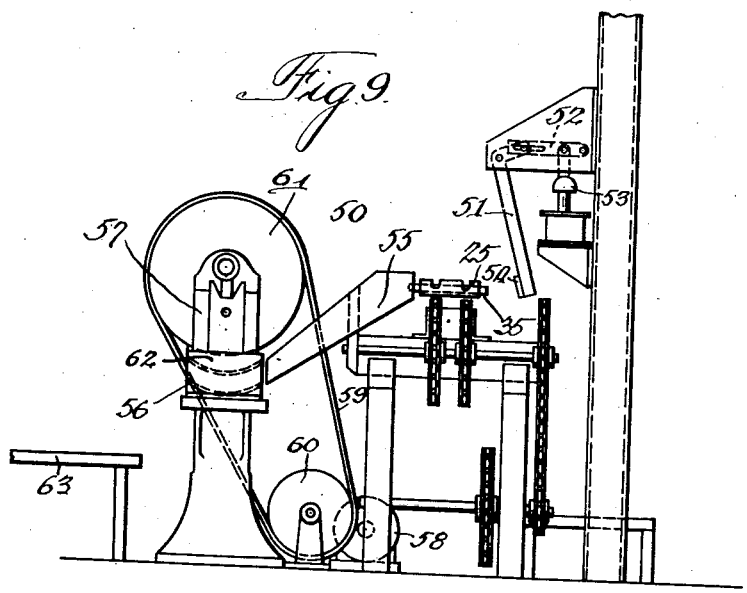
Fig. 9 is an elevational end view looking in the direction of the arrows 9—9 in Figs. 6 and 7.

A few steps further to the right (see Figs. 6 and 7) there is an ejecting and shaping device broadly designated 50, an elevational view of this device constituting all of Fig. 9. When the welded bundle 35 lying within the trough 25 arrives at that point, an arm 51, connected by means of the operating member 52 and solenoid 53, is automatically actuated so that the striking member 54 attached to the arm 51 will strike the end of the bundle 35, thus ejecting it into the slide 55 which directs it into the forming die 56 of the press 57, whereupon, under the influence of this press, which is operated from a suitable motor 58 and belt 59 and the therewith connected pulleys 60 and 61, the upper punch member 62 will descend, thus shaping the entire bundle into arcuate shape. After the punch member 62 has returned to its uppermost position, the bundle can be removed either manually or by mechanical ejecting means associated with the press, so that it may fall either upon the floor or upon a suitable receiving table, which latter is diagrammatically illustrated at the left of Fig. 9 and bears the designation 63. There will thus be received upon the table 63 the welded and shaped reinforcings which are the subject matter of the present invention. Their after-treatment consists in assembling them into a suitable dipping basket by means of which they are plunged into a bath of oil or asphalt paint, thereafter being dusted with, or rolled in, silica flour to paint or coat them with finely divided silica for the purpose of preventing their being burned when employed in brake shoes, during the manufacture of which molten metal is poured around the reinforcings.

The apparatus therefore consists of means for carrying in step-by-step progression a plurality of assembled layers of expanded metal, means for aligning the ends of these layers, means for bringing the layers within close proximity of each other, means for electrically welding the layers together, means for ejecting the welded bundles from the machine, and means for giving the bundle the desired arcuate shape. It is to be understood however that it will be within contemplation of the invention to shape the bundles prior to welding, suitable modifications—all within the skill of the mechanic—being made in the welding device shown in Fig. 8, so that it may accommodate an arcuate assembly in place of a flat one. Claims directed to the apparatus have been divided from this application and are contained in a divisional application Serial No. 381,374, filed March 1, 1941.

The invention is not to be circumscribed or limited by the precise orientation of the instrumentalities shown in Figs. 6 through 9, as these figures are purely illustrative of the fundamental principles upon which this invention is based and show the combination of the instrumentalities by means of which the article of the present invention is fabricated.

I claim:

1. The method of making a brake shoe reinforcing which comprises forming a plurality of elongated strips of expanded metal, each of said strips having substantially the same shape, positioning said strips in face-to-face relationship so that the end edges of each are substantially congruent, tightly clamping said strips together only adjacent their end edges, and passing a sufficiently heavy electrical current through said strips only adjacent said clamped end edges to weld them together at their points of contact adjacent said edges, whereby an integral, layered reinforcing is produced having flexibility and freedom of movement between the layers adjacent the central portions of said reinforcing.

2. The method of making a brake shoe reinforcing which comprises forming a plurality of elongated strips of expanded metal, each of said strips having substantially the same shape, positioning said strips in face-to-face relationship so that the end edges of each are substantially congruent, forming the strips so positioned into an arcuate shape, tightly clamping the arcuately shaped strips together only adjacent their end edges, and passing a sufficiently heavy electrical current through said strips only adjacent said clamped end edges to weld them together at their points of contact adjacent said edges, whereby an integral, layered, arcuate reinforcing is produced having flexibility and freedom of movement between the layers adjacent the central portions of said reinforcing.

3. The method of making a brake shoe reinforcing which comprises forming a plurality of elongated strips of expanded metal, each of said strips having substantially the same shape, positioning said strips in face-to-face relationship so that the end edges of each are substantially congruent, tightly clamping said strips together only adjacent their end edges, passing a sufficiently heavy electrical current through said strips only adjacent said clamped end edges to weld them together at their points of contact adjacent said edges, whereby an integral, layered reinforcing is produced having flexibility and freedom of movement between the layers adjacent the central portions of said reinforcing, and forming said reinforcing into an arcuate shape.

4. The method of making a brake shoe reinforcing which comprises forming a plurality of arcuate elongated strips of expanded metal, each of said strips having substantially the same shape, nesting said strips in face-to-face relationship so that the end edges of each are substantially congruent, tightly clamping said strips together only adjacent their end edges, and passing a sufficiently heavy electrical current through said strips only adjacent said clamped end edges to weld them together at their points of contact adjacent said edges, whereby an integral, layered, arcuate reinforcing is produced having flexibility and freedom of movement between the layers adjacent the central portions of said reinforcing.

5. The method of making a brake shoe reinforcing which comprises forming a plurality of elongated strips of expanded metal, each of said strips having substantially the same shape, positioning said strips in face-to-face relationship so that the end edges of each are substantially congruent, each of said strips being selected and positioned so that the diamond meshes in the expanded metal of each extend at an angle to those in an adjacent strip, tightly clamping said strips together only adjacent their end edges, and passing a sufficiently heavy electrical current through said strips only adjacent said clamped end edges to weld them together at their points of contact adjacent said edges, whereby an integral, layered reinforcing is produced having flexibility and freedom of movement between the layers adjacent the central portions of said reinforcing.

6. A brake shoe reinforcing of the character described comprising a plurality of arcuate elongated strips of expanded metal arranged in face-to-face relationship to form an arcuate elongated main body portion, said strips having substantially congruent end edges which form the end edge of said reinforcing, and said strips also being spot-welded to each other only adjacent said end edges to integrate and make rigid said main body portion without destroying the flexibility and freedom of movement between the strips adjacent the center of said arcuate main body portion.

7. The brake shoe reinforcing defined in claim 5 in which the diamond meshes in the expanded metal of one strip extend at an angle to the diamond meshes in the expanded metal of an adjacent strip.

WILLIAM M. McNEIL.

CERTIFICATE OF CORRECTION.

Patent No. 2,256,000.  September 16, 1941.

WILLIAM M. McNEIL.

It is hereby certified that error appears in the printed specification of the above numbered patent requiring correction as follows: Page 1, first column, lines 4 and 5, for "produe" read --produce--; page 4, second column, line 24, claim 7, for the claim reference numeral "5" read --6--; and that the said Letters Patent should be read with this correction therein that the same may conform to the record of the case in the Patent Office.

Signed and sealed this 3rd day of February, A. D. 1942.

(Seal)

Henry Van Arsdale,
Acting Commissioner of Patents.